Patented June 8, 1926.

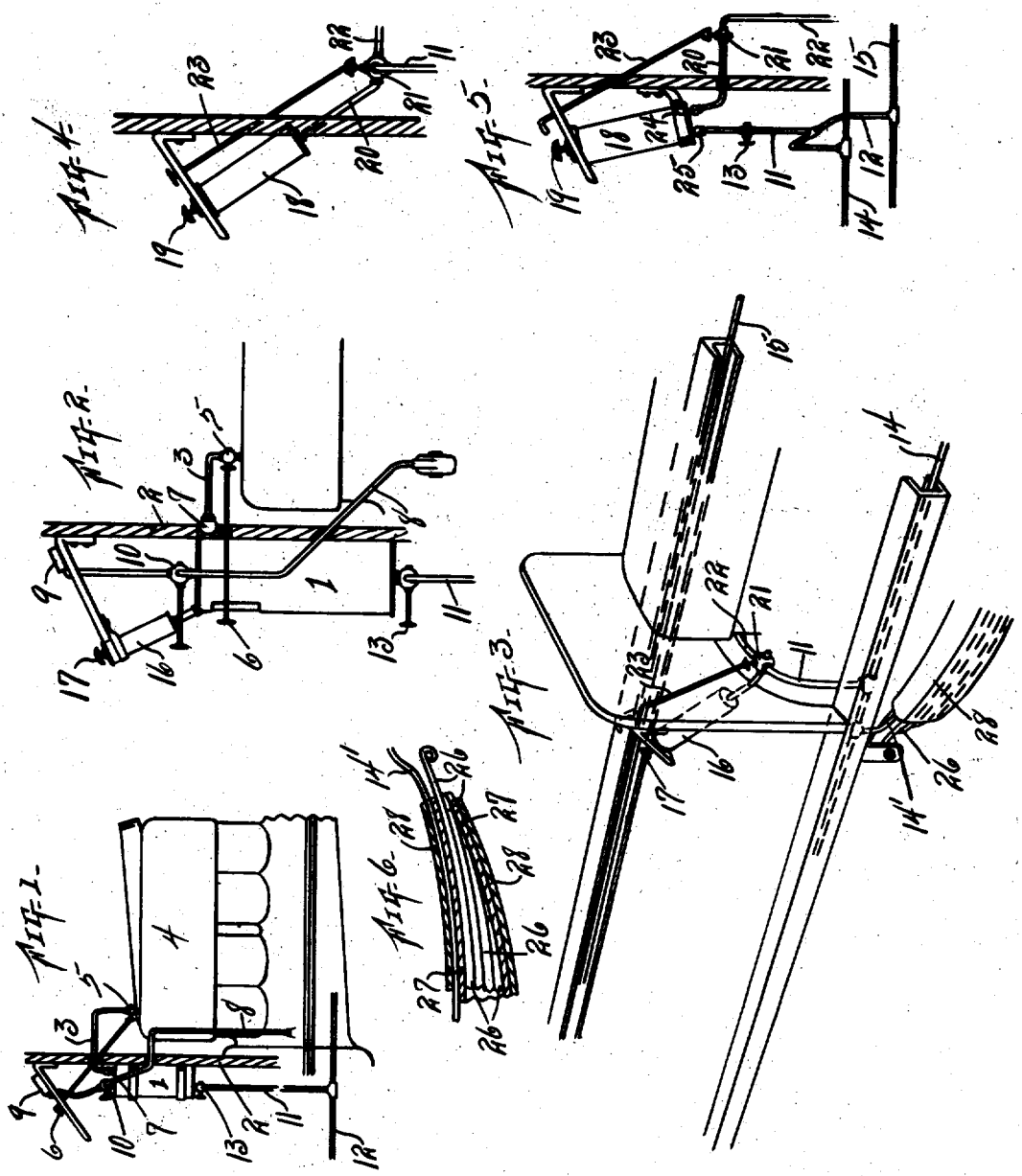

1,587,617

UNITED STATES PATENT OFFICE.

MARION W. SULLINS, OF BRECKENRIDGE, TEXAS.

LUBRICATING SYSTEM FOR MOTOR VEHICLES.

Application filed November 3, 1924. Serial No. 747,535.

My invention relates to lubricators and more particularly to means for lubricating motor vehicle working parts by the use of oil in the crank case and the motor; and the object is to obtain oil for lubricating purposes from the motor or crank case or other supply source and to hold the oil under pressure for forcing the oil into the various working parts which need lubricating, and to provide means for maintaining the pressure automatically by the operation of the motor or alternatively to maintain the pressure by manually operated pumps. Another object is to utilize the heat from a combustion chamber or cylinder for automatically pre-heating the oil and consequently pre-heating the whole lubricating system and at the same time obtaining the necessary pressure to lubricate all working parts and to provide means for preventing waste of oil in the working parts. Other objects and advantages will be fully explained in the following description and the invention will be more particularly pointed out in the claims.

Reference is had to the accompanying drawings which form a part of this application.

Fig. 1 is a side elevation of a portion of a motor equipped with the improved lubricating means. Fig. 2 is a similar view but showing also a manually operating pump in combination with the automatic system. Fig. 3 is a perspective view, showing the application of the devices shown in Fig. 2. Fig. 4 is a side elevation of a manually operated pump for use where the motor is not provided with a motor pressure pump, being a variation from the manually operated pump shown in Fig. 2. Fig. 5 is a side elevation of a manually operated pump which is a variation from the manually operated pumps previously shown. Fig. 6 is a broken sectional view, showing the manner of applying lubricating oil to the vehicle springs and showing means for preventing waste of the oil.

Similar characters of reference are used to indicate the same parts throughout the several views.

In the drawings, only a sufficient part of a motor vehicle is shown to show the application of the improvements. An oil reservoir 1 is mounted on the dash board 2. A pipe 3 is connected to one of the combustion chambers of the motor 4 and is provided with a stop cock 5 which may be operated from the instrument board by a control 6. The pipe 3 is also provided with a check valve 7 to hold the pressure in the reservoir 1. Means are provided for filling the reservoir 1 with lubricating material. A pipe 8 is connected to the oil pressure pump of the motor and extends to the oil gage 9 and a three-way valve 10 is provided for this pipe and the valve 10 is connected to the reservoir 1. To fill the tank 1, turn the valve 10 one quarter turn. This will cut the oil off from the pressure gage 9 and open the port to the tank 1 so that oil may come through the pipe 8 to the tank 1. When the tank is filled, turn the valve 10 back a quarter turn. This will let the oil back to the pressure gage 9. To put pressure on the oil in tank 1, open cock 5 so that pressure will come from the combustion chamber. A distribution pipe 11 is connected to the tank 1 and to the main distributing pipe 12 and is provided with a cock 13. Pipes may be connected to the pipe 12 to extend to the various working parts of the vehicle. Fig. 5 shows pipes 14 and 15 for such purposes.

Fig. 2 shows a manually operated pump 16 which is provided with a piston 17 for filling the pump or tank 1 with air, that is, air is pumped into the tank 1 to obtain pressure on the oil therein, so that pressure may be obtained without obtaining pressure from the engine. The advantage is that the working parts of the vehicle may be lubricated without starting the motor.

The variation shown in Fig. 4 is provided with a tank 18 which is provided with a piston 19. The tank 18 is connected by a pipe 20 with a three-way valve 21. A pipe 22 is connected to the three-way valve 21 and to the crank case of the motor. The valve 21 is controlled by the rod 23. For pumping oil out of the crank case, pull on the piston 19. This will fill the pump reservoir 18. To force the oil out through the working parts, turn the cock 21 one quarter turn and push the piston 19 inwardly. This will drive the oil out of pump 18 through the pipe 11.

The variation shown in Fig. 5 comprises a combination oil and air pump. The valve connection is different from that shown in Fig. 4. The pipe 20 is provided with an inlet check valve 24 and the pipe 11 is provided with an outlet check valve 25. When the valve 21 is turned to communicate the crank case through pipe 22, a pull on the piston 19 will fill the pump 18. To force the oil out through the pipe 11, force the piston 19 inwardly. The check valve 24 will be closed and the check valve 25 will be opened and the oil will be forced out through pipe 11. To use the pump 18 for an air pump, turn the valve 21 one quarter turn. The pump can then be filled with air by pulling the piston 19 outwardly. Pressure can then be had on the oil that may be in the system of distribution pipes by pressing the piston 19 back inwardly.

Fig. 6 illustrates how the working parts may be protected. The springs 26 may be covered with felt 27 to serve as a wick or oil distributer for the springs. One of the distribution pipes 14' is laid on the felt 27 and perforated to let oil out on the felt. Then the springs and felt are provided with a cover 28. This construction and arrangement will keep the dust and dirt out and will keep the springs lubricated.

Various other changes in the construction and arrangement of the several parts may be made without departing from my invention.

What I claim, is,—

1. In a motor vehicle provided with an operating motor and working parts of a motor vehicle; means for lubricating said working parts comprising a container and a gage associated with said container, means for supplying said container with a lubricant including a pipe extending from the oil pump of the motor to said container and to said gage, means for controlling the flow of lubricant to said container and gage, pipes for delivering lubricant to said working parts, and means for utilizing the pressure and heat of the combustion chamber of the motor for heating lubricant for all the working parts and for controlling the pressure on the lubricant in said container consisting of a pipe connected to said combustion chamber and to said container and a cock for said pipe and means for use of the operator to actuate said cock from his seat.

2. In a motor vehicle provided with an operating motor and working parts of a motor vehicle; means for lubricating said working parts comprising a container and gage therefor, means for supplying said container with a lubricant including a pipe extending from the oil pump of the motor to the container and its gage, means for utilizing pressure from a combustion chamber of said motor for forcing lubricant from said container including a pipe leading from the combustion chamber to the container and a means for controlling the passage of the pressure to the container, pipes for delivering the lubricant from said container to said working parts, and means for conserving the lubricant about said working parts.

In testimony whereof, I set my hand, this 25th day of October, 1924.

MARION W. SULLINS.